(12) United States Patent
Ben Attouch

(10) Patent No.: US 11,130,439 B2
(45) Date of Patent: Sep. 28, 2021

(54) VEHICLE HEADLIGHT SYSTEM AND METHOD FOR CONTROLLING AT LEAST ONE HEADLIGHT OF A VEHICLE

(71) Applicant: BOMBARDIER RECREATIONAL PRODUCTS INC., Valcourt (CA)

(72) Inventor: Walid Ben Attouch, Sherbrooke (CA)

(73) Assignee: BOMBARDIER RECREATIONAL PRODUCTS INC., Valcourt (CA)

( * ) Notice: Subject to any disclaimer, the term of this patent is extended or adjusted under 35 U.S.C. 154(b) by 0 days.

(21) Appl. No.: 17/127,480

(22) Filed: Dec. 18, 2020

(65) Prior Publication Data

US 2021/0188157 A1 Jun. 24, 2021

Related U.S. Application Data

(60) Provisional application No. 62/951,456, filed on Dec. 20, 2019.

(51) Int. Cl.
*B60Q 1/04* (2006.01)
*B60Q 1/00* (2006.01)

(52) U.S. Cl.
CPC .............. *B60Q 1/04* (2013.01); *B60Q 1/0076* (2013.01)

(58) Field of Classification Search
CPC .. B60Q 1/1423; B60Q 1/1446; B60Q 1/1453; B60Q 1/1476; B60Q 1/1469; B60Q 1/343; B60Q 1/1492; B60Q 1/04; B60Q 1/40; B60Q 1/0076; B60Q 1/441; B60Q 1/1461; B60Q 3/82; B60Q 5/001; B60K 37/06
See application file for complete search history.

(56) References Cited

U.S. PATENT DOCUMENTS

2012/0097508 A1* 4/2012 Son ..................... B60Q 1/1476
200/18

* cited by examiner

*Primary Examiner* — Wei (Victor) Y Chan
(74) *Attorney, Agent, or Firm* — BCF LLP

(57) ABSTRACT

A vehicle headlight system has at least one headlight having low, high and off modes. A controller is electrically connected to the at least one headlight and communicates with a switch. The switch has first, second and third positions. The second position is intermediate the first and third positions, and is biased to return to the second position from the third position. The controller controls the at least one headlight to be: in one of the low beam mode and the high beam mode when the switch is in the first position; in another one of the low beam mode and the high beam mode when the switch is in the second position; in the off mode when the switch is in the third position for more than a predetermined amount of time. A method for controlling at least one headlight of a vehicle is also disclosed.

20 Claims, 12 Drawing Sheets

VEHICLE HEADLIGHT SYSTEM AND METHOD FOR CONTROLLING AT LEAST ONE HEADLIGHT OF A VEHICLE

CROSS-REFERENCE TO RELATED APPLICATION

The present application claims priority to U.S. Provisional Patent Application Ser. No. 62/951,456, filed Dec. 20, 2019, entitled "Vehicle Headlight System and Method for Controlling at Least One Headlight of a Vehicle", which is incorporated by reference herein in its entirety.

TECHNOLOGICAL FIELD

The present technology relates to vehicle headlight systems and to methods for controlling at least one headlight of a vehicle.

BACKGROUND

Headlights are standard components in most vehicles, used to illuminate the path ahead of the vehicle. Though headlights come in various shapes, sizes and intensities, many have a high beam mode and a low beam mode, controllable by a driver. For a headlight having these modes, the headlight emits more light in the high beam mode than in the low beam mode.

On recreational vehicles such as side-by-side vehicles, all-terrain-vehicles, and snowmobiles, there is very limited space to install the various buttons required to operate the various functionalities of the headlights.

Therefore, there is a desire for a system capable of operating headlights, where the system is compact enough to be installed on recreational vehicles.

SUMMARY

It is an object of the present technology to ameliorate at least some of the inconveniences present in the prior art.

According to one aspect of the present technology, there is provided a vehicle headlight system. The vehicle headlight system has at least one headlight. The at least one headlight has a low beam mode, a high beam mode, and an off mode. The vehicle headlight system also has a controller electrically connected to the at least one headlight. The vehicle headlight system also has a switch that communicates with the controller. The switch has a first position, a second position, and a third position. The second position is intermediate the first and third positions, and the switch is biased to return to the second position from the third position. The controller controls the at least one headlight to be in one of the low beam mode and the high beam mode when the switch is in the first position. The controller also controls the at least one headlight to be in another one of the low beam mode and the high beam mode when the switch is in the second position, and the at least one headlight is not in the off mode when the switch is moved to the second position. The controller also controls the at least one headlight to be in one of the low beam mode and the high beam mode when the switch is in the third position for less than a predetermined amount of time. The controller also controls the at least one headlight to be in the off mode when the switch is in the third position for more than the predetermined amount of time.

In some embodiments, the controller controls the at least one headlight to be in the high beam mode when the switch is in the first position, and to be in the low beam mode when the switch is in the second position, and the at least one headlight is not in the off mode when the switch is moved to the second position.

In some embodiments, the controller controls the at least one headlight to be in the high beam mode when the switch is in the third position for less than the predetermined amount of time.

In some embodiments, when the at least one headlight is in the off mode, the at least one headlight remains in the off mode until the switch is moved to one of the first and third positions.

In some embodiments, the vehicle headlight system has a vehicle speed sensor that communicates with the controller. The controller determines a vehicle speed based on a signal received from the vehicle speed sensor. The controller controls the at least one headlight to be in the off mode when the switch is in the third position for more than the predetermined amount of time and the vehicle speed is less than a predetermined vehicle speed.

In some embodiments, when the at least one headlight is in the off mode, the controller controls the at least one headlight to be in the low beam mode if the vehicle speed exceeds the predetermined vehicle speed.

In some embodiments, the controller is configured to receive a plurality of control signals from at least one sensor. The controller controls the at least one headlight to be in the off mode when the switch is in the third position for more than the predetermined amount of time and no control signal of the plurality of control signals is abnormal.

In some embodiments, when the at least one headlight is in the off mode, the controller controls the at least one headlight to be in the low beam mode if at least one control signal of the plurality of control signals becomes abnormal.

In some embodiments, a display cluster communicates with the controller. The display cluster has a headlight mode input device. The controller controls the at least one headlight to be in the off mode when the headlight input device is in a predetermined position for more than the predetermined amount of time.

In some embodiments, the headlight input device is a button, and the predetermined position of the headlight input device is a pressed position of the button.

In some embodiments, the switch is a toggle switch.

In some embodiments, the vehicle headlight system has a switch housing. The switch is connected to the switch housing. The switch housing is adapted for being mounted to a handlebar of a vehicle.

In some embodiments, a vehicle has a frame, a seat mounted to the frame, a motor mounted to the frame and the vehicle headlight system.

In some embodiments, the vehicle has at least two wheels connected to the frame. The vehicle also has a handlebar pivotally connected to the frame and operatively connected to at least one of the at least two wheels. The seat is a straddle seat, and the switch is connected to the handlebar.

In another aspect of the present technology, a method for controlling at least one headlight of a vehicle is provided. The at least one headlight has a low beam mode, a high beam mode, and an off mode. The method includes controlling the at least one headlight to be in one of the low beam mode and the high beam mode when a switch is in a first position. The switch communicates with a controller that is electrically connected to the at least one headlight. The method also includes controlling the at least one headlight to be in another one of the low beam mode and the high beam mode when the switch is in a second position, and the at least one headlight is not in the off mode when the switch is moved to the second position. The method also includes controlling the at least one headlight to be in one of the low beam mode and the high beam mode when the switch is in a third position for less than a predetermined amount of time. The second position is intermediate the first and third positions, and the switch is biased to return to the second position from the third position. The method also includes controlling the at least one headlight to be in the off mode when the switch is in the third position for more than the predetermined amount of time.

In some embodiments, when the switch is in the first position, the method includes controlling the at least one headlight to be in the high beam mode. When the switch is in the second position, and the at least one headlight is not in the off mode when the switch is moved to the second position, the method includes controlling the at least one headlight to be in the low beam mode.

In some embodiments, when the switch is in the third position for less than the predetermined amount of time, the method includes controlling the at least one headlight to be in the high beam mode.

In some embodiments, when the at least one headlight is in the off mode, the method includes controlling the at least one headlight to remain in the off mode until the switch is moved to one of the first and third positions.

In some embodiments, the method includes determining a vehicle speed. The method also includes controlling the at least one headlight to be in the off mode when the switch is in the third position for more than the predetermined amount of time and the vehicle speed is less than a predetermined vehicle speed.

In some embodiments, when the at least one headlight is in the off mode, the method includes controlling the at least one headlight to be in the low beam mode if the vehicle speed exceeds the predetermined vehicle speed.

In some embodiments, the method includes controlling the at least one headlight to be in the off mode when the switch is in the third position for more than the predetermined amount of time and no control signal of the plurality of control signals is abnormal.

In some embodiments, when the at least one headlight is in the off mode, the method includes controlling the at least one headlight to be in the low beam mode if at least one of the control signal of the plurality of control signals becomes abnormal.

For purposes of the present application, terms related to spatial orientation when referring to a vehicle and components in relation to the vehicle, such as "vertical", "horizontal", "forwardly", "rearwardly", "left", "right", "above" and "below", are as they would be understood by a driver of the vehicle sitting thereon in an upright driving position, with the vehicle steered straight-ahead and being at rest on flat, level ground.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects, and advantages of implementations of the present technology will become apparent from the following description, the accompanying drawings, and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

DETAILED DESCRIPTION

The present technology will be described with reference to a four-wheeled straddle-seat all-terrain vehicle 20 (hereinafter "ATV"). It is contemplated that the present technology may be used with other vehicles such as snowmobiles and side-by-side vehicles.

Figure 1:
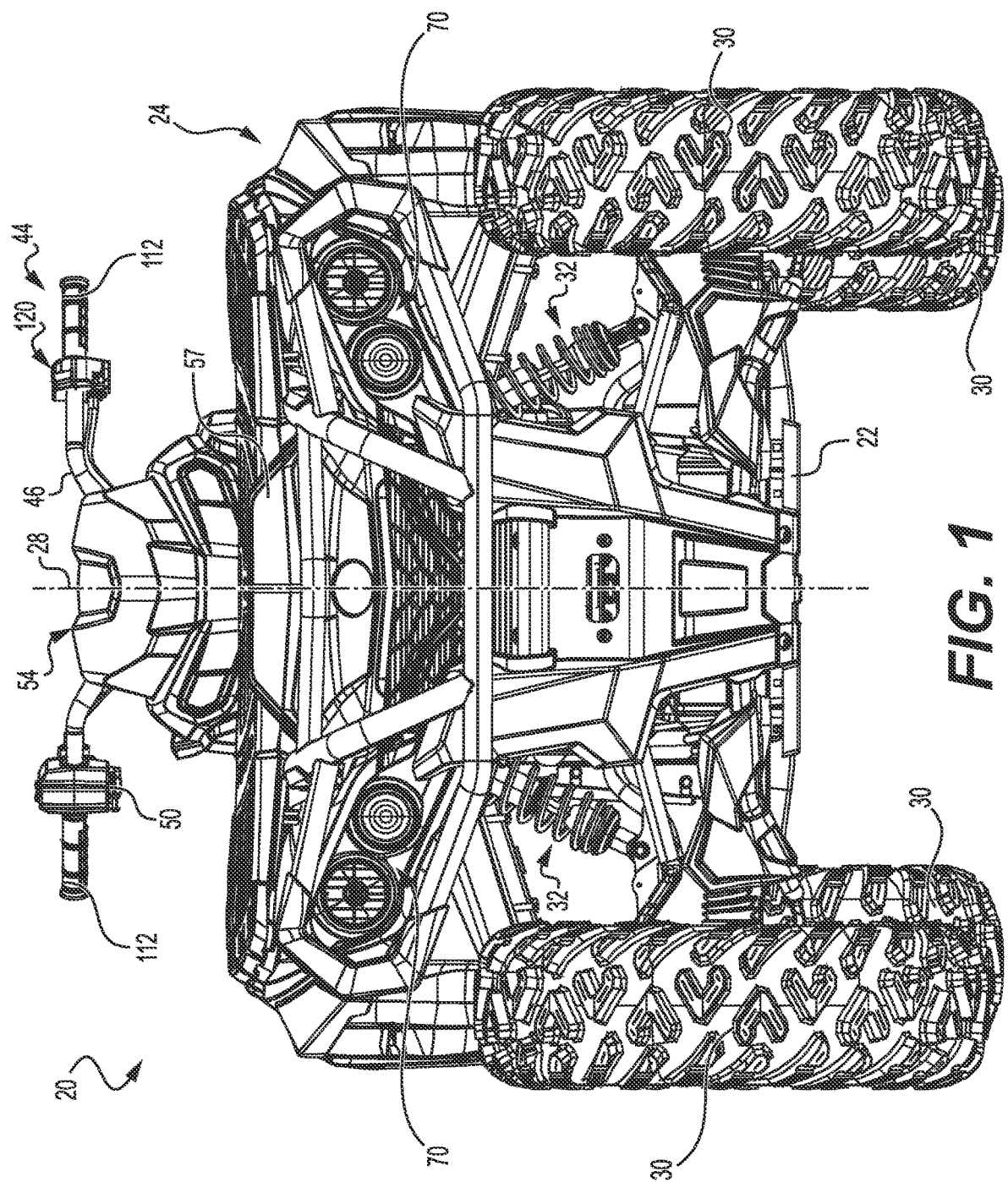
FIG. 1 is a front view a straddle-seat all-terrain vehicle.
Figure 2:
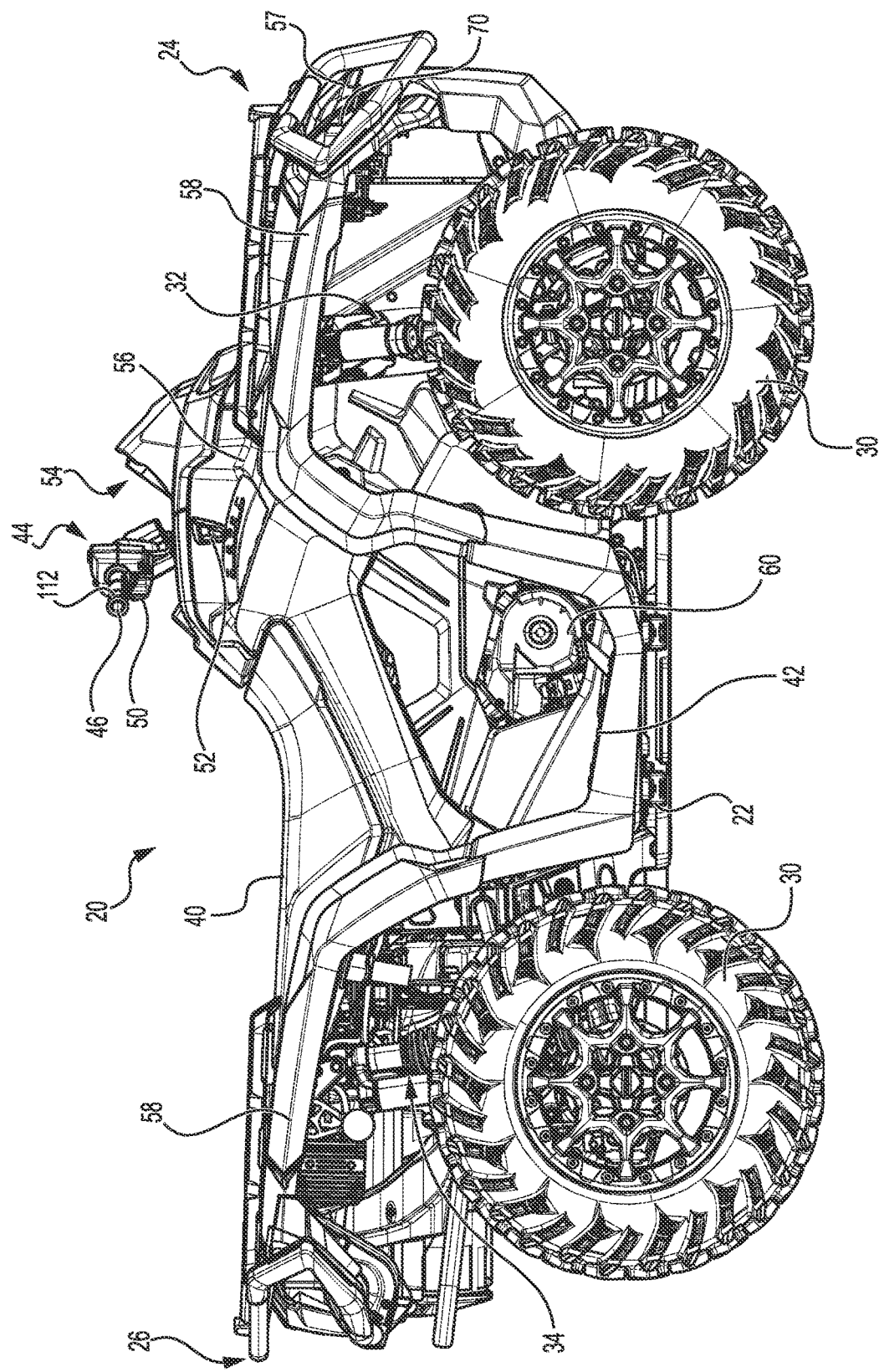
FIG. 2 is a right side elevation view of the vehicle of FIG. 1.
Figure 3:
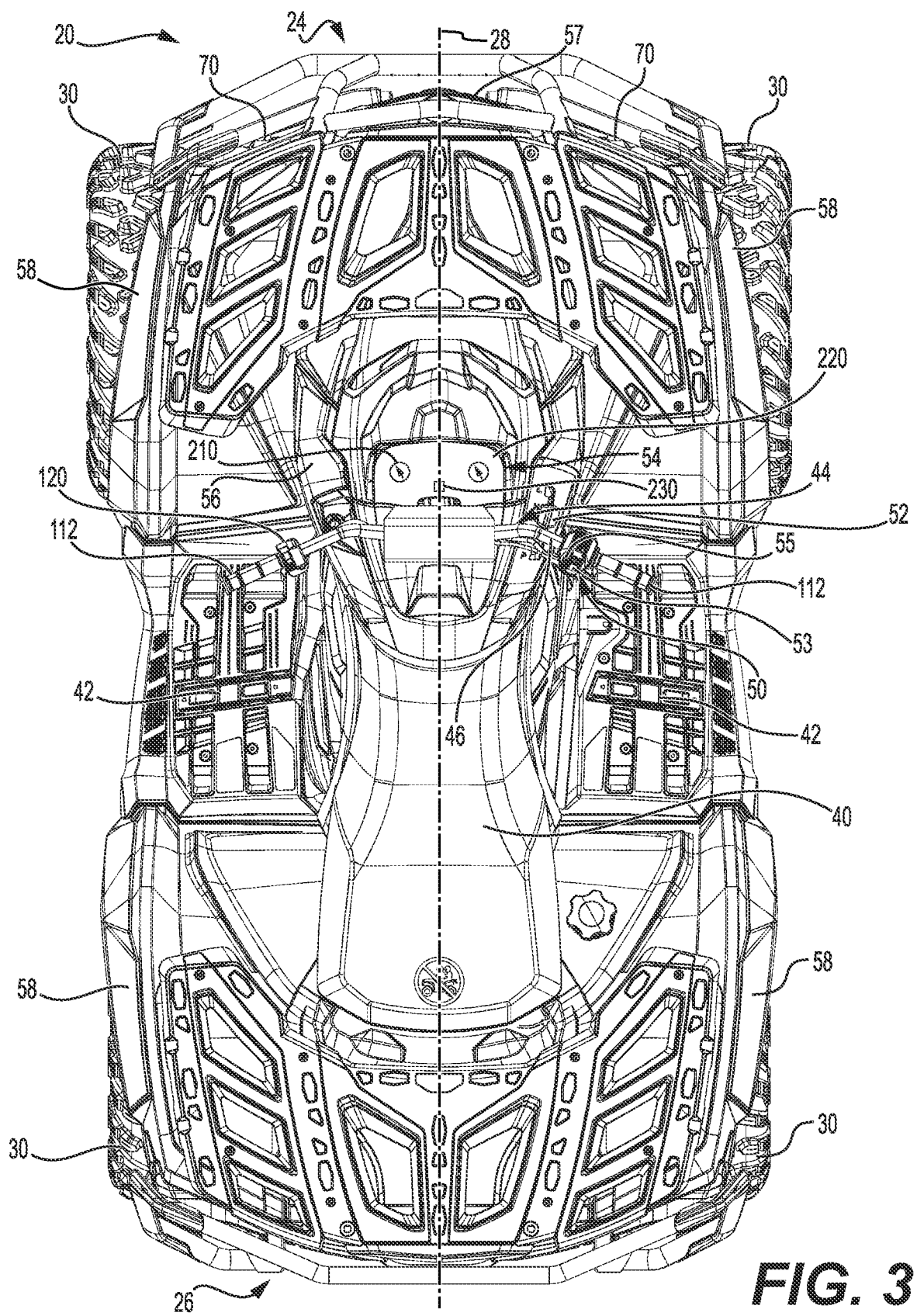
FIG. 3 is a top plan view of the vehicle of FIG. 1.

Referring to FIGS. 1 to 3, the ATV 20 has a frame 22 having a front end 24 and a rear end 26 defined consistently with a forward travel direction of the ATV 20. A longitudinal center plane 28 (FIGS. 1 and 3) extends vertically and longitudinally through a lateral center of the ATV 20. The ATV 20 has two front wheels 30 and two rear wheels 30. Each of the four wheels 30 is provided with low-pressure balloon tires adapted for off-road conditions and traversing rugged terrain. It is contemplated that the ATV 20 could have six wheels 30, or only three wheels 30.

The two front wheels 30 are suspended from the frame 22 by left and right front suspension assemblies 32 while the two rear wheels 30 are suspended from the frame 22 by left and right rear suspension assemblies 34.

Referring back to FIGS. 1 to 3, the ATV 20 further includes a straddle seat 40 connected to the frame 22 for accommodating a driver of the ATV 20. An internal combustion engine 60 (schematically illustrated in FIG. 2) is connected to the frame 22 for powering the ATV 20. It is contemplated that the engine 60 could be replaced by an electric motor or a hybrid propulsion unit (i.e. an internal combustion engine and an electric motor). The engine 60 is disposed under the straddle seat 40. The wheels 30 are operatively connected to the engine 60 via a continuously variable transmission (hereinafter CVT), a subtransmission and a driveline (all three not shown). Footrests 42 are laterally provided on either side of the straddle seat 40 and are disposed vertically lower than the straddle seat 40 to support the driver's feet. The footrests 42 are connected to the frame 22. A steering assembly 44 is rotationally connected the frame 22 to enable a driver to steer the ATV 20. The steering assembly 44 includes a handlebar 46 connected to a steering column assembly (not shown) for actuating steering linkages (not shown) operatively connected to left and right front wheels 30. Handle grips 112 are disposed on the ends of the handlebar 46. Other steering input devices, such as a steering wheel, could be used in other vehicles.

A throttle operator 50 (FIGS. 1 to 3), in the form of a thumb-actuated throttle lever, is mounted to a right side of the handlebar 46. Other types of throttle operators, such as a finger-actuated throttle lever and a twist grip, are also contemplated. A gear shifter 52 (FIGS. 2 and 3), located near the handlebar 46, operates the subtransmission and enables the driver to select one of a plurality of gear configurations for operation of the ATV 20. In the illustrated implementation of the ATV 20, the gear configurations include park, neutral, reverse, low, and drive. It is contemplated that the sequence and/or number of gear configurations could be different than as shown herein. A driving mode selector button 53 (FIG. 3) also enables the driver to select 2×4 or 4×4 operation of the ATV 20. Another driving mode selector 55 enables the driver to select locked wheel operation of the ATV 20 by locking a differential (not shown) of the driveline of the ATV 20. A display cluster 54, including a number of gauges and buttons, is disposed forwardly of the steering assembly 44.

The ATV 20 also includes fairings 56 extending over the frame 22 of the ATV 20, including a front fascia 57. A fender 58 is disposed over each wheel 30 to protect the driver and/or passenger from dirt, water and other debris being projected by the rotating wheels 30. The fenders 58 also define a portion of the wheel well in which each one of the wheels 30 rotates and, in the case of the front wheels 30, steers.

The ATV 20 also comprises a vehicle headlight system 300. The vehicle headlight system 300 includes left headlights 70 and right headlights 70 (hereinafter referred to as headlights 70). The headlights 70 are mounted to the front fascia 57. The headlights 70 have three operating modes: a low beam mode, a high beam mode and an off mode. It is contemplated that in some vehicles there could be only one headlight 70, or that there could be more than two headlights 70. The headlights 70 emit more light in the high beam mode than in the low beam mode.

The ATV 20 further includes other components such as brakes, a radiator, and the like. As it is believed that these components would be readily recognized by one of ordinary skill in the art, further explanation and description of these components will not be provided herein.

Figure 4:
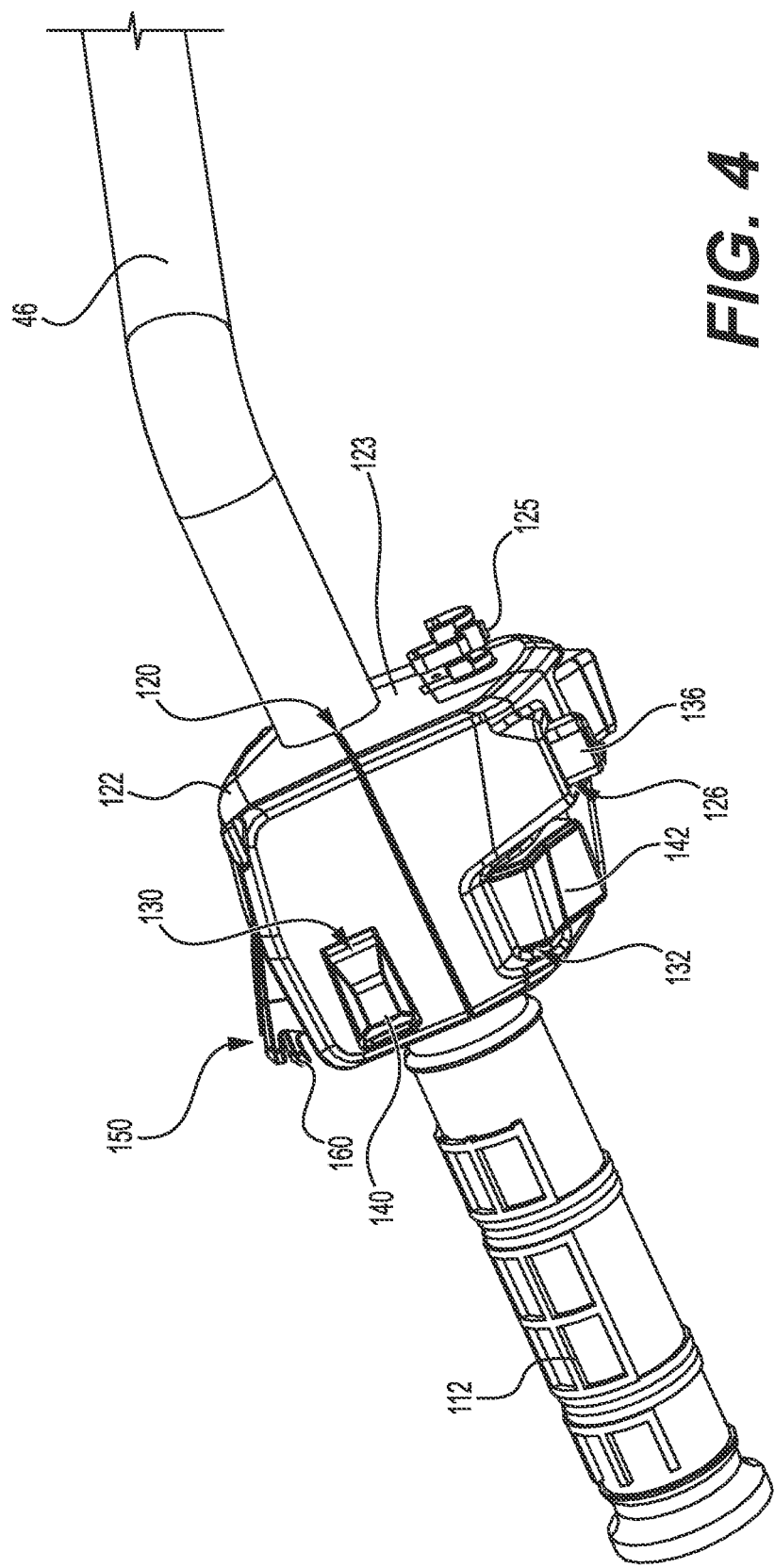
FIG. 4 is a top plan view of a left portion of a handlebar of the vehicle of FIG. 1 having a switch housing of the vehicle of FIG. 1 thereon, with a headlight switch being in a forward position.
Figure 5:
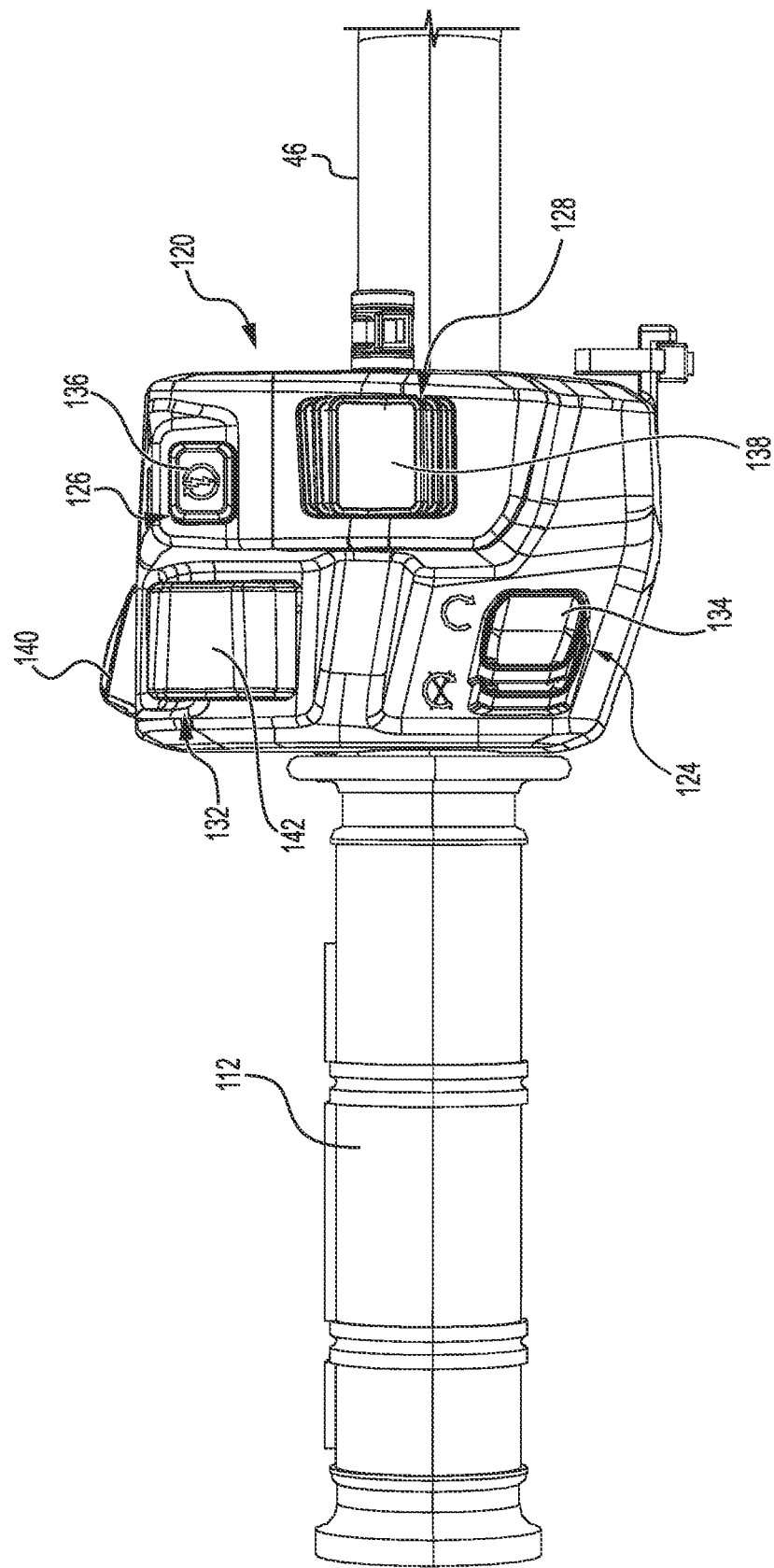
FIG. 5 is a rear elevation view of the components of FIG. 4.
Figure 6:
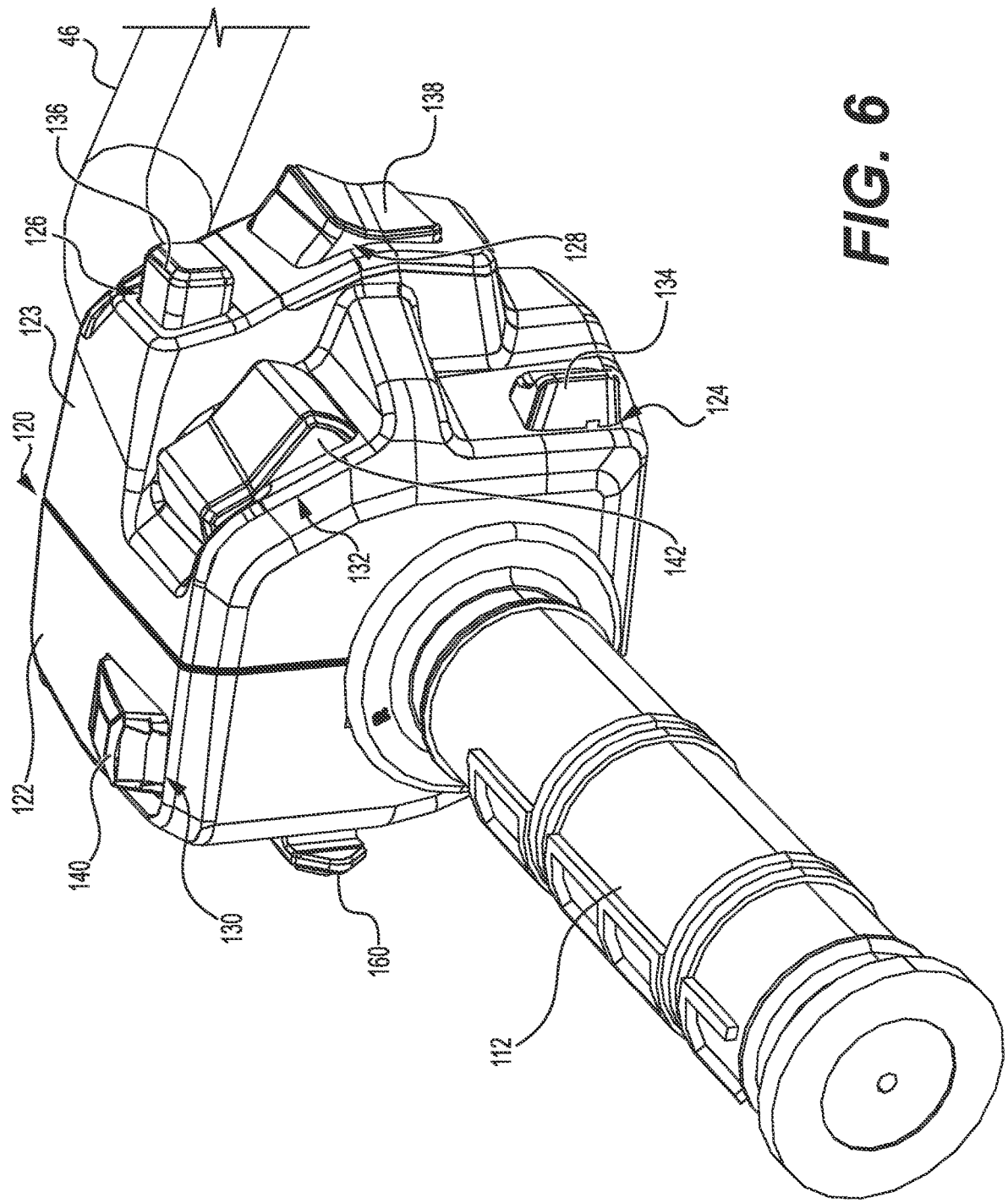
FIG. 6 is a perspective view taken from a rear, left side of the components of FIG. 4.

Referring to FIGS. 4 to 6, a switch control housing 120 is mounted to a left side of the handlebar 46 next to the left handle grip 112. The switch control housing 120 is made of a front housing portion 122 connected to a rear housing portion 123. The front housing portion 122 defines recesses 152 on each lateral side thereof. The rear housing portion 123 defines recesses 153 on each lateral side thereof. When the front housing portion 122 connects to the rear housing portion 123, the recesses 152, 153 define a circular shape on each lateral side of the switch control housing 120, inside which the handlebar 46 is received. It is contemplated that in alternative embodiments, the switch control housing 120 could be one integral component. In other embodiments, the switch control housing 120 could be made of more than two portions.

The front housing portion 122 defines on its top surface a speed limiter switch aperture 130 in which a speed limiter switch 140 is installed. On its forward surface, the front housing 122 defines a speed limiter set and reset switch aperture 150 in which speed limiter set and reset switches 160 are installed.

The speed limiter switch 140 has an on position and an off position. When the speed limiter switch 140 is in the on position, the ATV 20 cannot exceed a set speed. The set speed is set and reset by the driver using the speed limiter set and reset switches 160 respectively.

The rear housing 123 defines on its rear surface a run and stop switch aperture 124 in which a run and stop switch 134 is installed. The run and stop switch 134 is a toggle switch. It is contemplated that the run and stop switch 134 could be a type of switch other than toggle switch.

The run and stop switch 134 has a run position and a stop position. The ATV 20 is not operable when the run and stop switch 134 is in the stop position. If the ATV 20 is to be operated, the run and stop switch 134 must be in the run position.

The rear housing 123 defines on its rear surface a start and override switch aperture 126 in which a start and override switch 136 is installed. The start and override switch 136 is a push button switch. It is contemplated that the start and override switch 136 could be a type of switch other than a push button switch.

When the run and stop switch 134 is in the run position, the start and override switch 136 may be pushed to start the ATV 20. In some operating conditions, such as when the ATV 20 is in reverse, or when the lock wheel mode is engaged, the ATV 20 has a speed limit. The driver may override the speed limit by pushing the start and override switch 136.

The rear housing 123 defines on its rear surface a winch switch aperture 128 in which a winch switch 138 is installed. The winch switch 138 is a toggle switch. It is contemplated that the winch switch 138 could be a type of switch other than a toggle switch.

The ATV 20 has a winch, consisting of a winch motor, a winch cable and a hook connected to the winch cable, (neither of which are shown) connected to the frame 22. The winch switch 138 has a reel-out position, a neutral position and a reel-in position. When the winch switch 138 is in the reel-out position, the winch cable is reeled out from its initial position, either actively through the winch motor or non-actively. When the winch switch 138 is in the neutral position, the winch cable is not being actively being reeled-in or reeled-out. When the winch switch 138 is in the reel-in position, the winch motor reels the winch cable back to its initial position.

The rear housing 123 defines on its rear surface a headlight switch aperture 132 in which a headlight switch 142 is installed. The headlight switch 142 is a toggle switch. It is contemplated that the headlight switch 142 could be a type of switch other than a toggle switch.

The operation of the headlight switch 142 will be explained in greater detail further below. It is contemplated that in some embodiments, the headlight switch 142 could be placed elsewhere on the vehicle 20 such as on or near the display cluster 54 or near a front portion of the seat 40. It is also contemplated that in alternative embodiments, the headlight switch 142 could be directly placed on the handlebar 46. In other vehicles, such as a side-by-side vehicle, it is contemplated that the headlight switch 142 could be placed on a dashboard.

Figure 11:
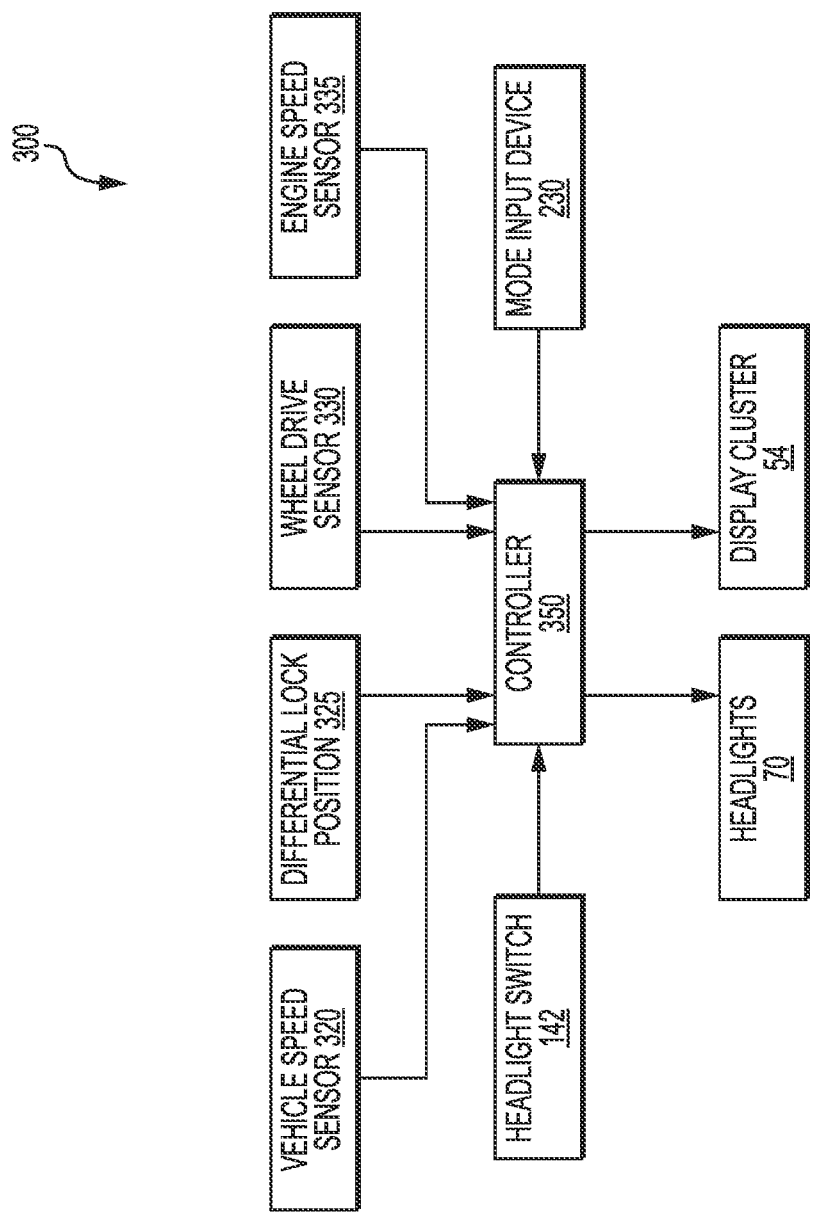
FIG. 11 is schematic illustration of a vehicle headlight system of the vehicle of FIG. 1.

Referring now to FIG. 11, the vehicle headlight system 300 further includes a controller 350 electrically connected by wires to the headlights 70. The controller 350 is also electrically connected by wires to a plurality of monitoring sensors. The plurality of monitoring sensors sends a plurality of control signals to the controller 350. The plurality of sensors includes, but is not limited to, a vehicle speed sensor 320, a differential lock position sensor 325, a wheel drive sensor 330, and an engine speed sensor 335. The vehicle speed sensor 320 senses a speed of the ATV 20. The sensed speed is transmitted to the controller 350. The differential lock position sensor 325 senses whether or not the lock wheel operation mode is engaged. The sensed mode is transmitted to the controller 350. The wheel drive sensor 330 senses whether the 2×4 or 4×4 operation mode is engaged. The sensed operation mode is transmitted to the controller 350. The engine speed sensor 335 senses a speed of the engine 60. The sensed speed is transmitted to the controller 350. The controller 350 communicates with the display cluster 54 and the headlights 70. The controller 350 also communicates with the headlight switch 142 and a headlight mode input device 230. It is contemplated that there could be other sensors connected to the controller 350. It is contemplated that in alternative embodiments the controller 350 could be connected to the headlights 70 by wireless means. It is also contemplated that the controller 350 could be connected to one or more of the monitoring sensors by wireless means.

Figure 7:
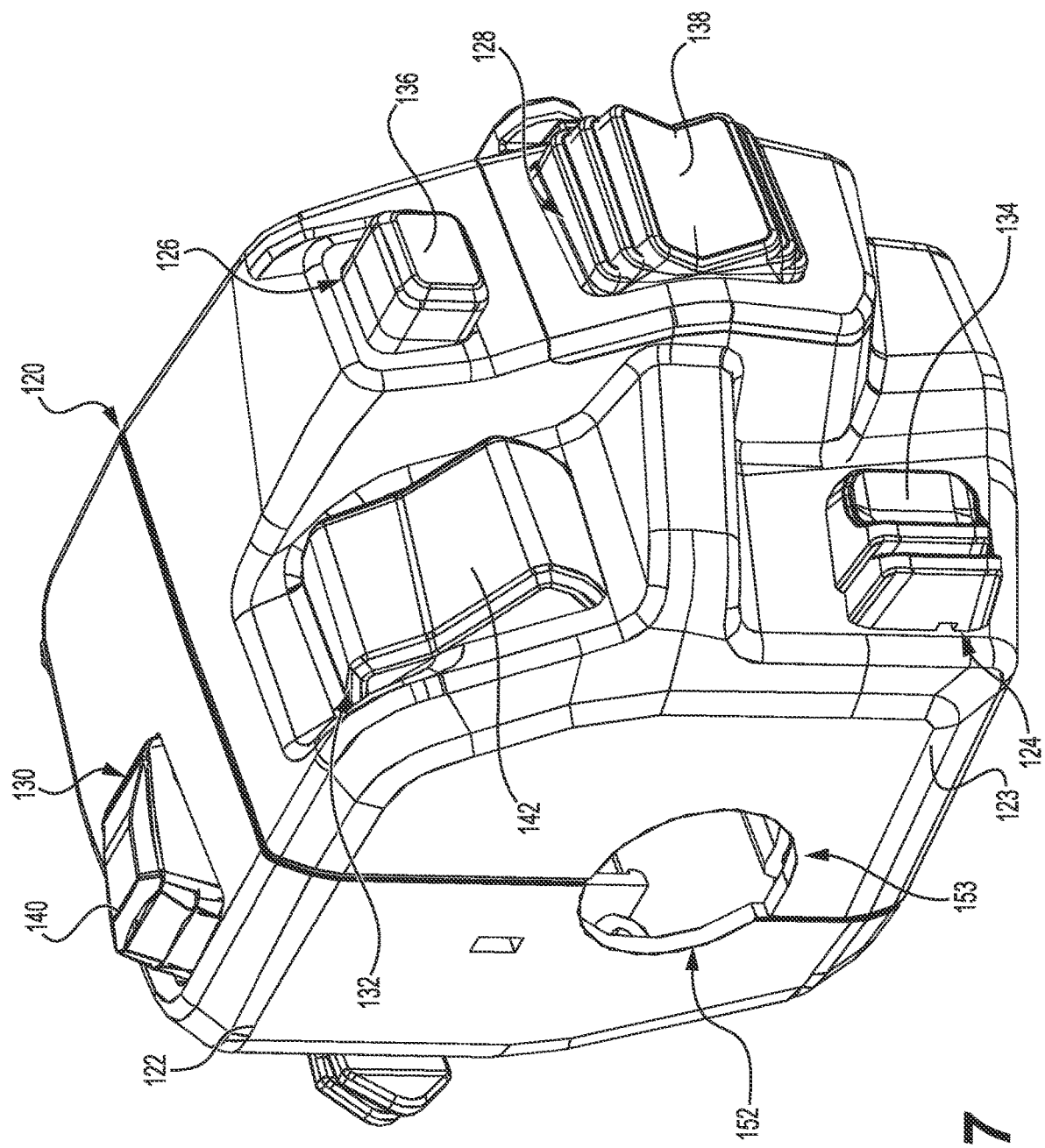
FIG. 7 is a perspective view taken from a rear, left side of the switch housing of FIG. 4, with the headlight switch being in the forward position.
Figure 8:
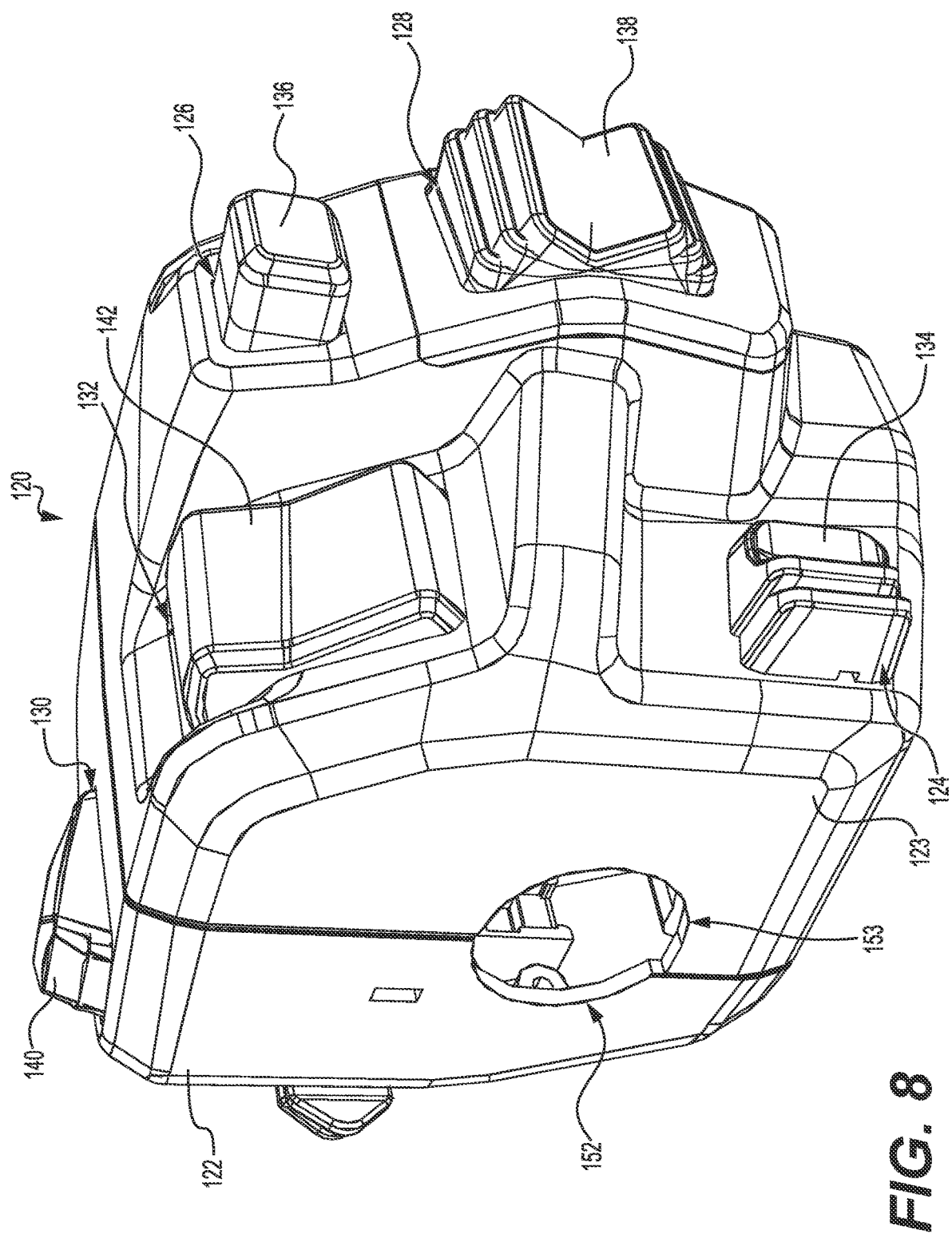
FIG. 8 is a perspective view taken from a rear, left side of the switch housing of FIG. 4, with the headlight switch being in a middle position.
Figure 9:
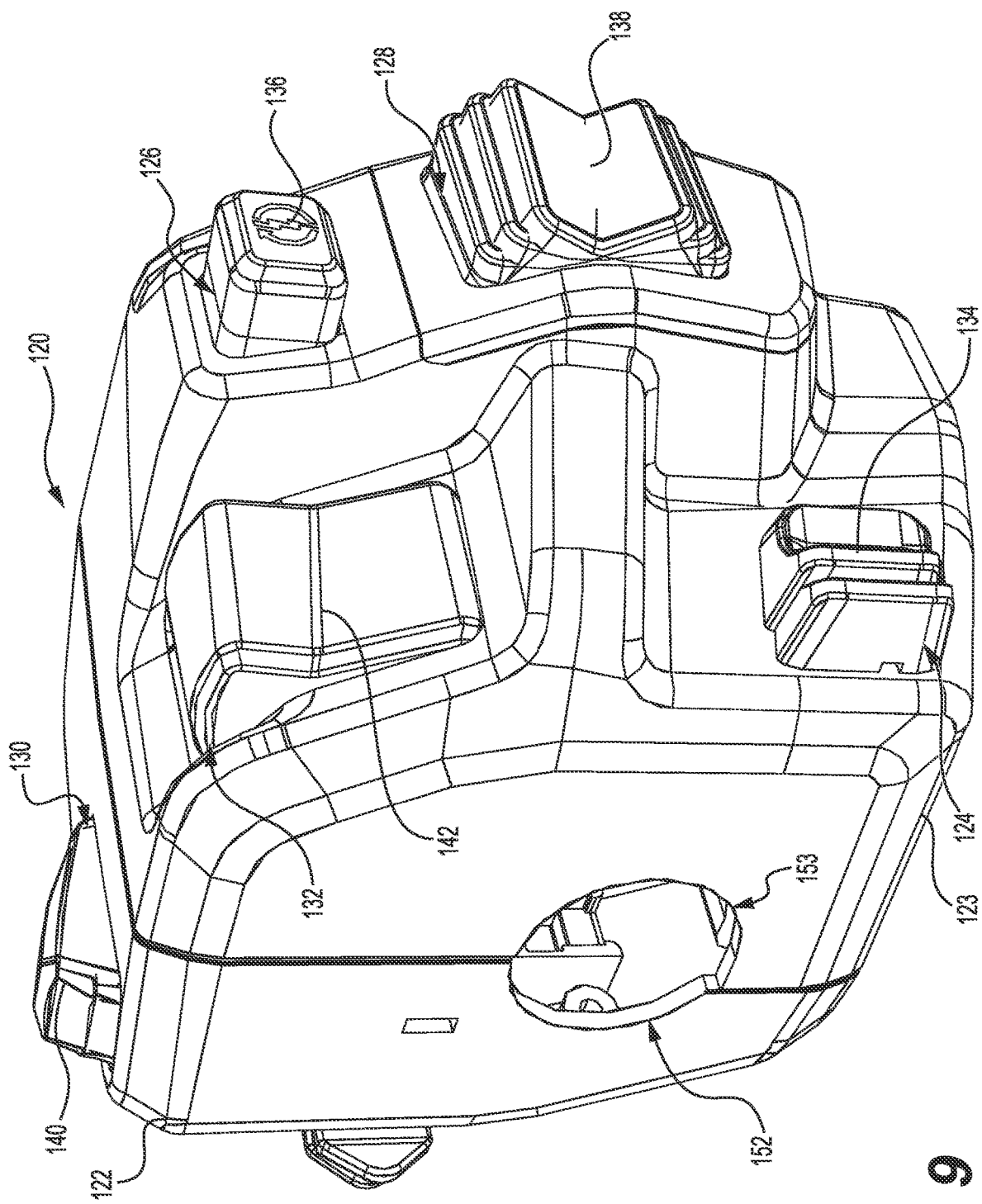
FIG. 9 is a perspective view taken from a rear, left side of the switch housing of FIG. 4, with the headlight switch being in a rearward position.

Referring to FIGS. 7 to 9, the operation of the headlight switch 142 will be explained. The headlight switch 142 can be in three different positions and each position can enable one of the three different headlight modes previously mentioned: high beam mode, low beam mode and off mode. As shown in FIG. 7, the headlight switch 142 can be in a forward position, hereinafter referred to as position A. As shown in FIG. 8, the headlight switch 142 can be in a middle position, hereinafter referred to as position B. As shown in FIG. 9, the headlight switch 142 can be in a rearward position past position B, hereinafter referred to as position C. When the headlight switch 142 is in position C, the headlight switch 142 is biased to return to position B once released. When the headlight switch 142 is toggled to position B or position A, the headlight switch 142 remains in that position once released. When the headlight switch 142 is toggled to position C, it returns to position B once released.

As mentioned above, the headlight switch 142 communicates with the controller 350, which operates the headlights 70. In the present embodiment, position A corresponds to the high beam mode, position B corresponds to the low beam mode, and position C corresponds to the off mode. This means that when the headlight switch 142 is in position A, the headlights 70 of the ATV 20 are in the high beam mode. When the headlight switch 142 is in position B, the headlights 70 of the ATV 20 are in the low beam mode, if the headlights 70 were not in the off mode prior to headlight switch being toggled to position B as will be explained below. When the headlight switch 142 is maintained in position C for less than a predetermined amount of time, the headlights 70 of the ATV 20 are in the high beam mode, which is commonly referred to as "flashing the high beams". When the headlight switch 142 is maintained in position C for a predetermined amount of time or longer and if a given set of conditions is respected, the headlights 70 of the ATV 20 are turned off. One embodiment of the given set of conditions is explained further below. When the headlight switch 142 is released from position C, the headlight switch 142 returns to position B. When the headlights 70 are turned off and the headlight switch 142 returns to position B, the headlights 70 remain off. To turn the headlights 70 back on, the headlight switch 142 must be toggled to position A, in which case the headlights 70 will be put in the high beam mode, or to position C for less than the predetermined amount of time, in which case the headlights 70 will first "flash" into high beam mode and then will be put in low beam mode once the switch 142 is released and returns to position B. In one embodiment, the predetermined amount of time is five seconds. It is contemplated that in other embodiments, the predetermined time may be longer or shorter.

The given set of conditions that must be respected for the headlights 70 to be turned off include: the sensed speed of the ATV 20 must be below a predetermined speed, such as 20 km/h, and the controller 350 must not receive any abnormal control signals from the plurality of monitoring sensors. It is contemplated that other conditions could be established. It is contemplated that in other embodiments, the predetermined speed may be greater or lower than 20 km/h. If the headlights 70 are turned off, and any one of the control signals of the plurality of monitoring sensors is abnormal, the headlights 70 are turned back on in the low beam mode. When the headlights 70 are turned off, and then the controller 350 detects that the ATV 20 speed exceeds the predetermined speed, the controller 350 operates the headlights 70 to be in the low beam mode.

It is contemplated that in other embodiments, position A could correspond to the low beam mode and position B could correspond to the high beam mode. It is also contemplated that the switch 142 could be oriented such that position C is the forward position and position A is the rearward position. It is also contemplated that the switch 142 could be oriented laterally such that position A is on one of the left and right sides and position C is on the other of the left and right sides.

Figure 10:
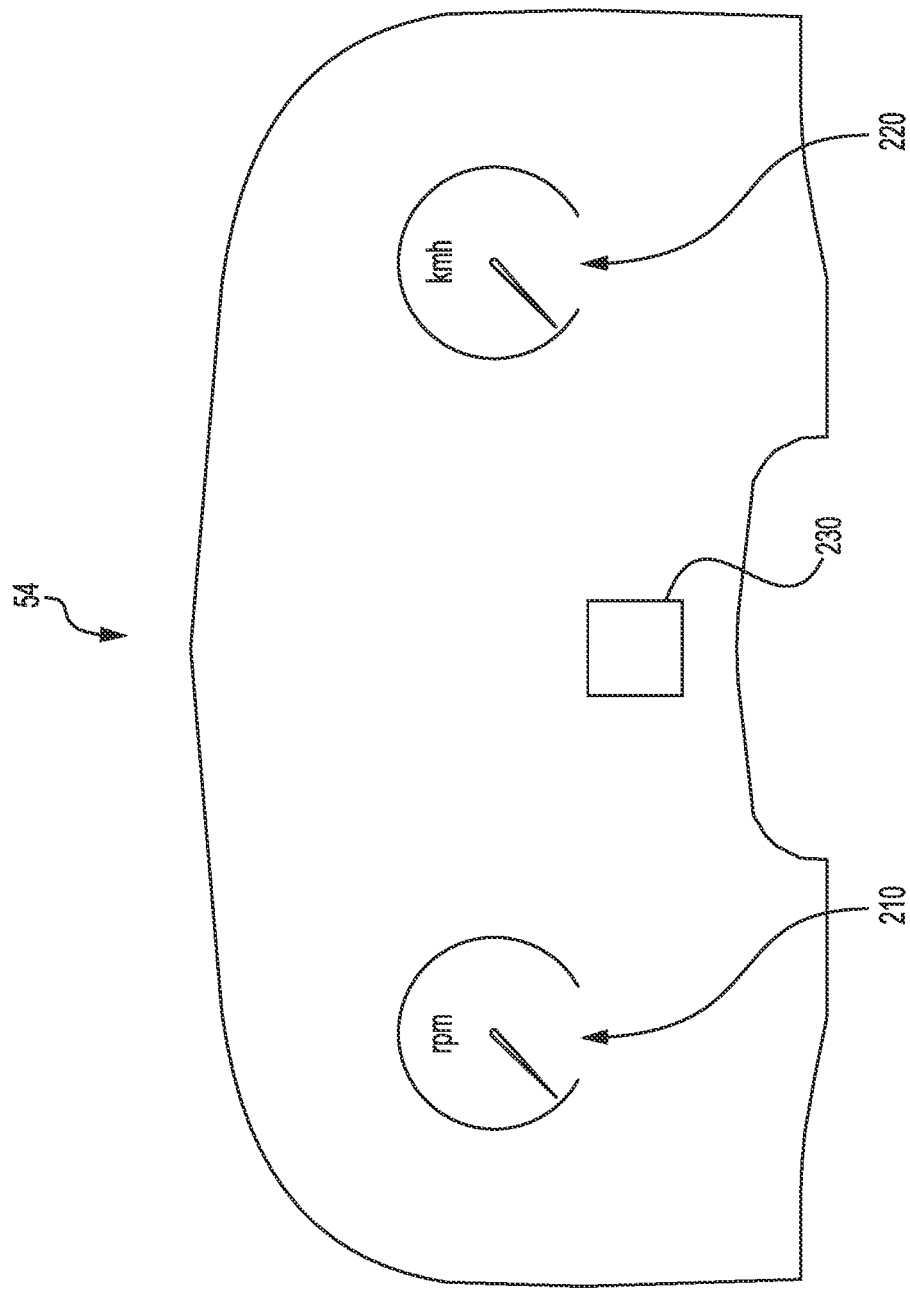
FIG. 10 is a schematic illustration of a display cluster of the vehicle of FIG. 1.

Referring now to FIG. 10, the display cluster 54 has an engine speed indicator 210, a vehicle speed indicator 220 and a headlight mode input device 230. The headlight mode input device 230 is a press button switch. Holding the headlight mode input device 230 to a predetermined position for a predetermined period of time puts the headlights 70 in the off mode. The headlight mode input device 230 acts as an override to the headlight switch 142, but the headlight mode input device 230 is subject to the same set of conditions to turn the headlights 70 off as the headlight switch 142. As such, for the input device 230 to turn off the headlights 70, the ATV 20 speed has to be below the predetermined speed and the controller 350 should not receive any abnormal control signals from the plurality of monitoring sensors. It is contemplated that the input device 230 could also be used to turn the headlights 70 back on in the low be mode when the headlights 70 are in the off mode. In alternate embodiments, the headlight mode input device 230 could be a type of switch other than a push button switch.

As an illustrative example, the headlight switch 142 of the ATV 20 begins in position B. The driver may change the position of the headlight switch 142 by toggling the headlight switch 142 in the forward direction such that it corresponds to position A. When the driver lets go of the headlight switch 142, it remains in position A. In this configuration, the headlights 70 are in the high beam mode.

When the headlight switch 142 is in this configuration, the driver may change the position of the headlight switch 142 by toggling the headlight switch 142 in the rearward direction, such that, the position of the headlight switch 142 corresponds to position B. When the driver releases the headlight switch 142, the headlight switch 142 remains in position B. In this configuration, the headlights 70 are in the low beam mode.

The driver may once again change the position of the headlight switch 142 by toggling the headlight switch 142 further in the rearward direction, such that it corresponds to position C. When the driver releases the headlight switch 142 while it is in position C, the headlight switch 142 returns to position B.

When the driver maintains the headlight switch 142 in position C for less than the predetermined amount of time, the headlights 70 are in the high beam mode while the headlight switch 142 is in position C. When the headlight switch 142 is released, the headlight switch 142 returns to position B, and the headlights 70 are back in the low beam mode.

When the driver maintains the headlight switch 142 in position C for the predetermined amount of time or longer but the set of conditions described above is not respected, the headlights 70 do not turn off. In this scenario, the headlights 70 remain in the high beam mode as long as the headlight switch 142 is in position C and return to the low beam when the headlight switch 142 is released. A signal is sent to the display cluster 54 to inform the driver that the headlights 70 may not be turned off under the current conditions.

When the driver maintains the headlight switch 142 in position C for the predetermined amount of time or longer and the set of conditions described above is respected, the headlights 70 are turned off. Upon release, the headlight switch 142 returns to position B. Given that the headlights 70 were in the off mode prior to the headlight switch 142 being toggled to position B, the headlights 70 remain off, and are not put in the low beam mode.

When the headlights 70 are in the off mode, in order to turn the headlights 70 back on, the driver must toggle the headlight switch 142 to position A or position C. If the headlight switch 142 is toggled to position A, the headlights 70 are put in the high beam mode. If the headlight switch 142 is toggled to position C for less than the predetermined amount of time, the headlights 70 are first put in the high beam mode for that amount of time, and upon the release of the headlight switch 142, the headlight switch 142 returns to position B, and the headlights 70 are put in the low beam mode.

Figure 12:
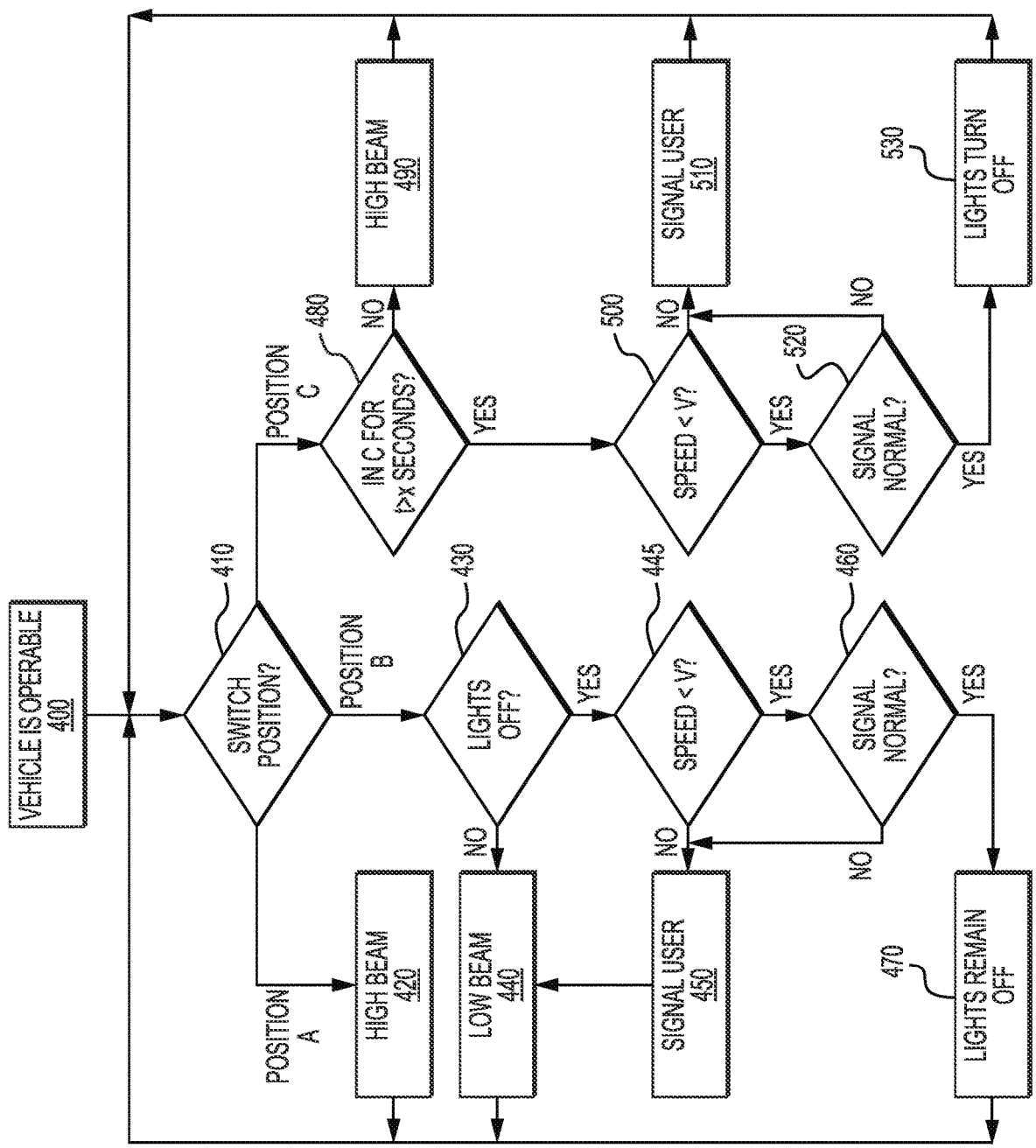
FIG. 12 is a logic diagram illustrating a method for controlling the vehicle headlight system of FIG. 11.

Referring now to FIG. 12, a method for controlling the headlights 70 of the ATV 20 using the vehicle headlight system 300 will be explained. For the headlight system 300 to function, the ATV 20 must be operating. As such, the method begins at step 400 where the controller 350 determines that the ATV 20 is operating.

Then at step 410, the controller 350 determines a position of the headlight switch 142.

If at step 410 the controller 350 determines that the headlight switch 142 is in position A, at step 420 the controller 350 puts the headlights 70 in the high beam mode. Once the high beam mode has been activated, the controller 350 returns to step 410.

If at step 410 the controller 350 determines that the headlight switch 142 is in position B, then at step 430 the controller 350 determines whether the headlights 70 are currently in the off mode or not.

If at step 430 the controller 350 determines that the headlights 70 are on (i.e. high beam mode or low beam mode), then at step 440 the controller 350 puts the headlights 70 in the low beam mode. Once the low beam mode has been activated, the controller 350 returns to step 410.

If at step 430 the controller 350 determines that the headlights 70 are off, then at step 445 the controller 350 performs a speed check.

If at step 445 the controller 350 determines that the speed of the ATV 20 is greater than a predetermined speed V, then at step 450 the controller 350 sends a signal to the display cluster 54 to inform the driver that the headlights 70 cannot be turned off in the present conditions. Once the signal has been sent, the controller 350 proceeds to step 440. In one embodiment, the predetermined speed V is 20 km/h, but it is contemplated that it could be higher or lower in other embodiments.

If at step 445 the controller 350 determines that the speed of the ATV 20 is below the predetermined speed V, then at step 460, the controller 350 performs a control signal check.

It is contemplated that at step 445, the controller 350 could perform the speed check with respect to an engine speed instead of the vehicle speed. It is also contemplated that two separate speed checks could be performed: one with respect to vehicle speed as in step 445 and on with respect to engine speed.

If at step 460 the controller 350 determines that one of the control signal received from the plurality of sensors shown in FIG. 11 is abnormal, the controller 350 proceeds to step 450, and continues as described above.

If at step 460 the controller 350 determines that all of the control signals received are normal, then at step 470 the controller 350 maintains the headlights 70 in the off mode. The controller 350 then returns to step 410.

If at step 410 the controller 350 determines that the headlight switch 142 is in position C, then at step 480, the controller 350 measures a time T for which the headlight switch 142 is maintained in the position C. The controller 350 determines whether the measured time T is greater than a predetermined amount of time X. In one embodiment, the predetermined amount of time X is 5 seconds, but it is contemplated that it could be longer or shorter.

If at step 480 the controller 350 determines that the measured time T is less than the predetermined amount of time X, then at step 490 the controller 350 puts the headlights 70 in the high beam mode. Once the high beam mode has been activated, the controller 350 returns to step 410. Accordingly, if the user places the headlight switch 142 in position C and then releases the headlight switch 142 before X seconds have elapsed, the headlights 70 will first be put in the high beam mode (step 490) while the switch is held in position C and will then be put in the low beam mode (step 440) when the headlight switch 142 returns to position B, thus "flashing the high beams".

If at step 480 the controller 350 determines that the measured time T is greater than the predetermined amount of time X, then at step 500 the controller 350 performs a speed check.

If at step 500 the controller 350 determines that the speed of the ATV 20 is greater than the predetermined speed V, then at step 510 the controller 350 sends the signal to the display cluster 54 to inform the driver that the headlights 70 cannot be turned off in the present conditions. Once the signal has been sent, the controller 350 returns to step 410.

If at step 500 the controller 350 determines that the speed of the ATV 20 is below the predetermined speed V, then at step 520, the controller 350 performs a control signal check.

It is contemplated that at step 500, the controller 350 could perform a speed check with respect to an engine speed instead of the vehicle speed. It is also contemplated that two separate speed checks could be performed: one with respect to vehicle speed as in step 500 and on with respect to engine speed.

If at step 520 the controller 350 determines that one of the control signals received from the plurality of sensors shown in FIG. 11 is abnormal, the controller 350 proceeds to step 510, and continues as described above.

If at step 520 the controller 350 determines that all of the control signals received are normal, then at step 530 the controller 350 puts the headlights 70 in the off mode. The controller 350 then returns to step 410.

It is contemplated that the control signal checks 460, 520 could be performed before the vehicle speed checks 445, 500. It is contemplated that the control signal checks 460, 520 and the vehicle speed checks 445, 500 could be performed simultaneously. It is contemplated that other checks could be performed. It is contemplated that the signal sent to the display cluster 54 could be more specific and describe through various means why the headlights 70 cannot be turned off, or the signal could be more general.

Modifications and improvements to the above-described embodiments of the present invention may become apparent to those skilled in the art. The foregoing description is intended to be exemplary rather than limiting. The scope of the present invention is therefore intended to be limited solely by the appended claims.

What is claimed is:

1. A vehicle headlight system comprising:
   at least one headlight, the at least one headlight having:
      a low beam mode,
      a high beam mode, and
      an off mode;
   a controller electrically connected to the at least one headlight; and
   a switch communicating with the controller, the switch having:
      a first position,
      a second position, and
      a third position,
   the second position being intermediate the first and third positions, the switch being biased to return to the second position from the third position,
   the controller controlling the at least one headlight to be in one of the low beam mode and the high beam mode when the switch is in the first position,
   the controller controlling the at least one headlight to be in another one of the low beam mode and the high beam mode when:
      the switch is in the second position, and
      the at least one headlight is not in the off mode when the switch is moved to the second position,
   the controller controlling the at least one headlight to be in one of the low beam mode and the high beam mode when the switch is in the third position for less than a predetermined amount of time, and
   the controller controlling the at least one headlight to be in the off mode when the switch is in the third position for more than the predetermined amount of time.

2. The vehicle headlight system of claim 1, wherein:
   the controller controls the at least one headlight to be in the high beam mode when the switch is in the first position,
   the controller controls the at least one headlight to be in the low beam mode when:
      the switch is in the second position, and
      the at least one headlight is not in the off mode when the switch is moved to the second position.

3. The vehicle headlight system of claim 1, wherein the controller controls the at least one headlight to be in the high beam mode when the switch is in the third position for less than the predetermined amount of time.

4. The vehicle headlight system of claim 1, wherein when the at least one headlight is in the off mode, the at least one headlight remains in the off mode until the switch is moved to one of the first and third positions.

5. The vehicle headlight system of claim 1, further comprising a vehicle speed sensor communicating with the controller, the controller determining a vehicle speed based on a signal received from the vehicle speed sensor; and
   wherein the controller controls the at least one headlight to be in the off mode when the switch is in the third position for more than the predetermined amount of time and the vehicle speed is less than a predetermined vehicle speed.

6. The vehicle headlight system of claim 5, wherein when the at least one headlight is in the off mode, the controller controls the at least one headlight to be in the low beam mode if the vehicle speed exceeds the predetermined vehicle speed.

7. The vehicle headlight system of claim 1, wherein the controller is configured to receive a plurality of control signals from at least one sensor; and
   wherein the controller controls the at least one headlight to be in the off mode when the switch is in the third position for more than the predetermined amount of time and no control signal of the plurality of control signals is abnormal.

8. The vehicle headlight system of claim 7, wherein when the at least one headlight is in the off mode, the controller controls the at least one headlight to be in the low beam mode if at least one control signal of the plurality of control signals becomes abnormal.

9. The vehicle headlight system of claim 1, further comprising a display cluster communicating with the controller;
   wherein:
      the display cluster has a headlight mode input device; and
      the controller controlling the at least one headlight to be in the off mode when the headlight input device is in a predetermined position for more than the predetermined amount of time.

10. The vehicle headlight system of claim 9, wherein:
    the headlight input device is a button; and
    the predetermined position of the headlight input device is a pressed position of the button.

11. The vehicle headlight system of claim 1, wherein the switch is a toggle switch.

12. The vehicle headlight system of claim 1, further comprising a switch housing;
    wherein:
       the switch being connected to the switch housing; and
       the switch housing being adapted for being mounted to a handlebar of a vehicle.

13. A method for controlling at least one headlight of a vehicle, the at least one headlight having:
    a low beam mode,
    a high beam mode, and
    an off mode;
    the method comprising:
       controlling the at least one headlight to be in one of the low beam mode and the high beam mode when a switch is in a first position, the switch communicating with a controller being electrically connected to the at least one headlight;

controlling the at least one headlight to be in another one of the low beam mode and the high beam mode when:
the switch is in a second position, and
the at least one headlight is not in the off mode when the switch is moved to the second position;
controlling the at least one headlight to be in one of the low beam mode and the high beam mode when the switch is in a third position for less than a predetermined amount of time, the second position being intermediate the first and third positions, the switch being biased to return to the second position from the third position, and
controlling the at least one headlight to be in the off mode when the switch is in the third position for more than the predetermined amount of time.

14. The method of claim 13, wherein:
when the switch is in the first position, the at least one headlight is controlled to be in the high beam mode; and
when:
the switch is in the second position, and
the at least one headlight is not in the off mode when the switch is moved to the second position,
the at least one headlight is controlled to be in the low beam mode.

15. The method of claim 13, wherein when the switch is in the third position for less than the predetermined amount of time, the at least one headlight is controlled to be in the high beam mode.

16. The method of claim 13, wherein when the at least one headlight is in the off mode, the at least one headlight is controlled to remain in the off mode until the switch is moved to one of the first and third positions.

17. The method of claim 13, further comprising:
determining a vehicle speed; and
controlling the at least one headlight to be in the off mode when the switch is in the third position for more than the predetermined amount of time and the vehicle speed is less than a predetermined vehicle speed.

18. The method of claim 17, wherein when the at least one headlight is in the off mode, the at least one headlight is controlled to be in the low beam mode if the vehicle speed exceeds the predetermined vehicle speed.

19. The method of claim 13, wherein the at least one headlight is controlled to be in the off mode when the switch is in the third position for more than the predetermined amount of time and no control signal of the plurality of control signals is abnormal.

20. The method of claim 19, wherein when the at least one headlight is in the off mode, the at least one headlight is controlled to be in the low beam mode if at least one of the control signal of the plurality of control signals becomes abnormal.

* * * * *